(12) United States Patent
Jang et al.

(10) Patent No.: US 10,826,086 B2
(45) Date of Patent: Nov. 3, 2020

(54) THERMAL MANAGEMENT SYSTEM FOR FUEL CELL VEHICLE

(71) Applicants: Hyundai Motor Company, Seoul (KR); Kia Motors Corporation, Seoul (KR)

(72) Inventors: Junho Jang, Yongin-si (KR); Dong Hoon Nam, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/559,378

(22) Filed: Sep. 3, 2019

(65) Prior Publication Data

US 2019/0393520 A1 Dec. 26, 2019

Related U.S. Application Data

(63) Continuation of application No. 15/624,270, filed on Jun. 15, 2017, now Pat. No. 10,468,693.

(30) Foreign Application Priority Data

Feb. 15, 2017 (KR) ........................ 10-2017-0020669

(51) Int. Cl.
*H01M 8/04007* (2016.01)
*H01M 8/04082* (2016.01)
(Continued)

(52) U.S. Cl.
CPC ..... *H01M 8/04052* (2013.01); *H01M 8/0432* (2013.01); *H01M 8/04037* (2013.01);
(Continued)

(58) Field of Classification Search
CPC combination set(s) only.
See application file for complete search history.

(56) References Cited

U.S. PATENT DOCUMENTS

| 4,369,234 A | 1/1983 | Zaromb |
| 5,512,145 A | 4/1996 | Hollenberg |

(Continued)

FOREIGN PATENT DOCUMENTS

KR 10-2009-0062587 A 6/2009

OTHER PUBLICATIONS

Garrier et al., "MgH$_2$ intermediate scale tank tests under various experimental conditions," *International Journal of Hydrogen Energy*, 36:9719-9726 (2011). Park et al., "Review on Thermal Storage Media for Cavern Thermal Energy Storage," *Tunnel & Underground Space*, vol. 22, 4:243-256 (2012).

*Primary Examiner* — Kaity V Chandler
(74) *Attorney, Agent, or Firm* — Morgan, Lewis & Bockius LLP

(57) ABSTRACT

A thermal management system for a fuel cell vehicle may include a fuel cell stack, a solid-state hydrogen storage device, and a hydrogen supply pipe, wherein the fuel cell stack receives hydrogen and air configured to generate electricity and discharge water, wherein the solid-state hydrogen storage device includes a first container accommodating a solid-state hydrogen storage material, a second container accommodating a thermochemical thermal energy storage material, a third container accommodating a heat transfer medium, and pipes connected to the first container, the second container, and the third container to circulate the heat transfer medium, and wherein the hydrogen supply pipe is connected to the first container and the fuel cell stack.

7 Claims, 10 Drawing Sheets

(51) Int. Cl.
    *H01M 8/0432*      (2016.01)
    *H01M 8/04701*     (2016.01)
    *H01M 8/04291*     (2016.01)
    *H01M 8/065*       (2016.01)

(52) U.S. Cl.
    CPC ... *H01M 8/04074* (2013.01); *H01M 8/04216* (2013.01); *H01M 8/04291* (2013.01); *H01M 8/04335* (2013.01); *H01M 8/04373* (2013.01); *H01M 8/04708* (2013.01); *H01M 8/065* (2013.01); *H01M 2250/20* (2013.01); *Y02T 10/70* (2013.01); *Y02T 90/40* (2013.01)

(56) References Cited

U.S. PATENT DOCUMENTS

| | | | |
|---|---|---|---|
| 6,368,735 | B1 | 4/2002 | Lomax et al. |
| 8,940,083 | B2 | 1/2015 | De Rango et al. |
| 9,718,684 | B1 | 8/2017 | Woodall |
| 9,731,967 | B1 | 8/2017 | Woodall |
| 2002/0022162 | A1 | 2/2002 | Kagitani |
| 2002/0025462 | A1 | 2/2002 | Nakanishi et al. |
| 2003/0009942 | A1 | 1/2003 | Amendola |
| 2003/0033991 | A1 | 2/2003 | Cheng |
| 2003/0091503 | A1 | 5/2003 | Rosenfeld |
| 2003/0091879 | A1 | 5/2003 | Rusta-Sellehy |
| 2004/0023087 | A1 | 2/2004 | Redmond |
| 2004/0025808 | A1 | 2/2004 | Cheng |
| 2004/0052722 | A1 | 3/2004 | Jorgensen |
| 2004/0081615 | A1 | 4/2004 | Brinkley |
| 2004/0148857 | A1 | 8/2004 | Strizki |
| 2004/0205997 | A1 | 10/2004 | Youngblood |
| 2005/0069489 | A1 | 3/2005 | Zhao |
| 2005/0180915 | A1 | 8/2005 | Bingham |
| 2005/0191235 | A1 | 9/2005 | Vajo |
| 2006/0228295 | A1 | 10/2006 | Bingham |
| 2007/0020175 | A1 | 1/2007 | Graham |
| 2007/0062115 | A1 | 3/2007 | Berry |
| 2008/0025880 | A1 | 1/2008 | Shurtleff |
| 2008/0090116 | A1 | 4/2008 | Nakai |
| 2009/0233153 | A1 | 9/2009 | Carlisle |
| 2009/0252671 | A1 | 10/2009 | Fullerton |
| 2012/0052001 | A1 | 3/2012 | Woodall |
| 2012/0122017 | A1 | 5/2012 | Mills |
| 2013/0084474 | A1 | 4/2013 | Mills |
| 2013/0115139 | A1 | 5/2013 | Stern |
| 2013/0236393 | A1 | 9/2013 | Maury |
| 2014/0072836 | A1 | 3/2014 | Mills |
| 2015/0040848 | A1 | 2/2015 | McAlister |
| 2015/0233266 | A1 | 8/2015 | Firkan |
| 2015/0274523 | A1 | 10/2015 | Jin |
| 2016/0365589 | A1 | 12/2016 | Iftime et al. |
| 2017/0187057 | A1 | 6/2017 | Thangavelautham |
| 2018/0131018 | A1 | 5/2018 | Perry |

THERMAL MANAGEMENT SYSTEM FOR FUEL CELL VEHICLE

CROSS-REFERENCE TO RELATED APPLICATION

The present application is a continuation of U.S. patent application Ser. No. 15/624,270, filed Jun. 15, 2017, which claims priority to Korean Patent Application No. 10-2017-0020669, filed on Feb. 15, 2017, the entire contents of which are incorporated herein for all purposes by this reference.

BACKGROUND OF THE INVENTION

Field of the Invention

The present invention relates to a thermal management system for a fuel cell vehicle.

Description of Related Art

A hydrogen fuel cell is an environmentally-friendly power generation device that generates electricity by supplying hydrogen and air and discharges pure water, and may be utilized as a power source for an electric vehicle. The hydrogen fuel cell may receive hydrogen from a solid-state hydrogen storage container. The solid-state hydrogen storage container includes a hydrogen storage material that discharges hydrogen at a specific temperature, and a complex hydride based on a metal hydride may be used as the hydrogen storage material to increase volume-storage density.

The complex hydride requires a continuous heat supply to discharge hydrogen, thus it is required to increase the heat supply efficiency of a heat exchanger having a predetermined size. Research and development for increasing the heat supply efficiency are being focused on by improving an inner structure of the solid-state hydrogen storage container.

Particularly, due to properties of the metal hydride reacting at a predetermined high temperature, it is necessary to improve cold start performance when applied to an electric vehicle. For the present case, an additional balance of plant (BOP) is required, for example, a hydrogen heat combustor may be disposed, or battery power may be used to heat the solid hydrogen storage container. However, the additional balance of plant (BOP) increases a volume of a related system and causes energy loss, thus it results in low fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a thermal management system for a fuel cell vehicle that may improve fuel efficiency by continuously supplying heat to a solid-state hydrogen storage container without an additional power supply, and by use of all power generated in a fuel cell for driving the fuel cell vehicle.

Various aspects of the present invention are directed to providing a thermal management system for a fuel cell vehicle including a fuel cell stack, a solid-state hydrogen storage device, and a hydrogen supply pipe. The fuel cell stack may receive hydrogen and air configured to generate electricity and discharge water. The solid-state hydrogen storage device may include a first container accommodating a solid-state hydrogen storage material, a second container accommodating a thermochemical thermal energy storage material, a third container accommodating a heat transfer medium, and pipes connected to the first container, the second container, and the third container to circulate the heat transfer medium. The hydrogen supply pipe may be connected to the first container and the fuel cell stack.

The solid-state hydrogen storage material may include a material that generates heat while occluding hydrogen and discharges hydrogen while receiving heat. The thermochemical thermal energy storage material may include a material that generates heat while a catalyst is supplied, and is separated into a metal oxide and a catalyst and stores heat energy while receiving heat.

The heat transfer medium may transfer heat of the first container to the second container while occluding the hydrogen of the solid-state hydrogen storage material, and may transfer heat of the second container to the first container while the catalyst is supplied to the thermochemical thermal energy storage material. The solid-state hydrogen storage material may include at least one of a complex metal hydride, a metal hydride, a chemical hydride, and a hydrogen storage alloy.

The catalyst may be water, and the thermochemical thermal energy storage material may include at least one of $Mg(OH)_2$, $Ca(OH)_2$, $Be(OH)_2$, $Mn(OH)_2$, $Ni(OH)_2$, and $Zn(OH)_2$. The solid-state hydrogen storage device may include a fourth container accommodating the catalyst, a catalyst supply pipe and a catalyst discharge pipe connected to the fourth container and the second container, and a first valve provided at the catalyst discharge pipe. The first valve may include one inlet port, a first outlet port connected to the fourth container, and a second outlet port connected to the outside of the solid-state hydrogen storage device.

The thermal management system for the fuel cell vehicle may further include a water supply pipe configured to be connected to the fuel cell stack and the fourth container, and a third valve configured to be provided at the water supply pipe. The third valve may include one inlet port, a fifth outlet port connected to the fourth container, and a sixth outlet port connected to the outside of the solid-state hydrogen storage device.

The catalyst may be oxygen, and the thermochemical thermal energy storage material may include at least one of $Co_3O_4$, $Mn_2O_3$, $Li_2O_2$, $MgO_2$, $Cr_5O_{12}$, $PtO_2$ and $Sb_2O_5$. The solid-state hydrogen storage device may include an air supply device supplying air to the second container, an air discharge pipe that is disposed at the second container and discharges air during heat energy storage, and a pressure control pipe that is disposed at the second container and discharges residual air during heat discharge.

A second valve may be provided at the pressure control pipe. The second valve may include one inlet port, a third outlet port connected to the outside of the solid-state hydrogen storage device, and a fourth outlet port connected to the outside of the solid-state hydrogen storage device through the third container.

When a temperature of the residual air discharged to the pressure control pipe is lower than that of the heat transfer medium of the third container, the third outlet port may be opened. When a temperature of the residual air discharged to the pressure control pipe is higher than that of the heat transfer medium of the third container, the fourth outlet port may be opened. The thermal management system for the fuel cell vehicle may further include an air supply pipe configured to be connected to the fuel cell stack and the air supply device.

The solid-state hydrogen storage device may include an auxiliary heater that supplies heat to at least one of the first container and the second container.

According to the embodiments of the present invention, a separate power supply for supplying heat to the first container is not required, and it is possible to not use power except for operating the auxiliary heater for a short time when an initial chemical reaction is started or when an emergency occurs. Accordingly, the power generated in the fuel cell stack may be fully utilized for driving the vehicle, improving fuel efficiency.

In addition, since the thermochemical thermal energy storage material with excellent reversibility is utilized, heat loss is small during charging and discharging, and since it is possible to control heat dissipation using the catalyst ($H_2O$ or $O_2$), the thermal management system for the fuel cell vehicle according to the exemplary embodiment of the present invention is safe and environmentally friendly. Further, when the catalyst is supplied to the second container without operating the fuel cell stack, since the heating may be performed by the thermal energy emitted from the second container, it is possible to improve energy efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
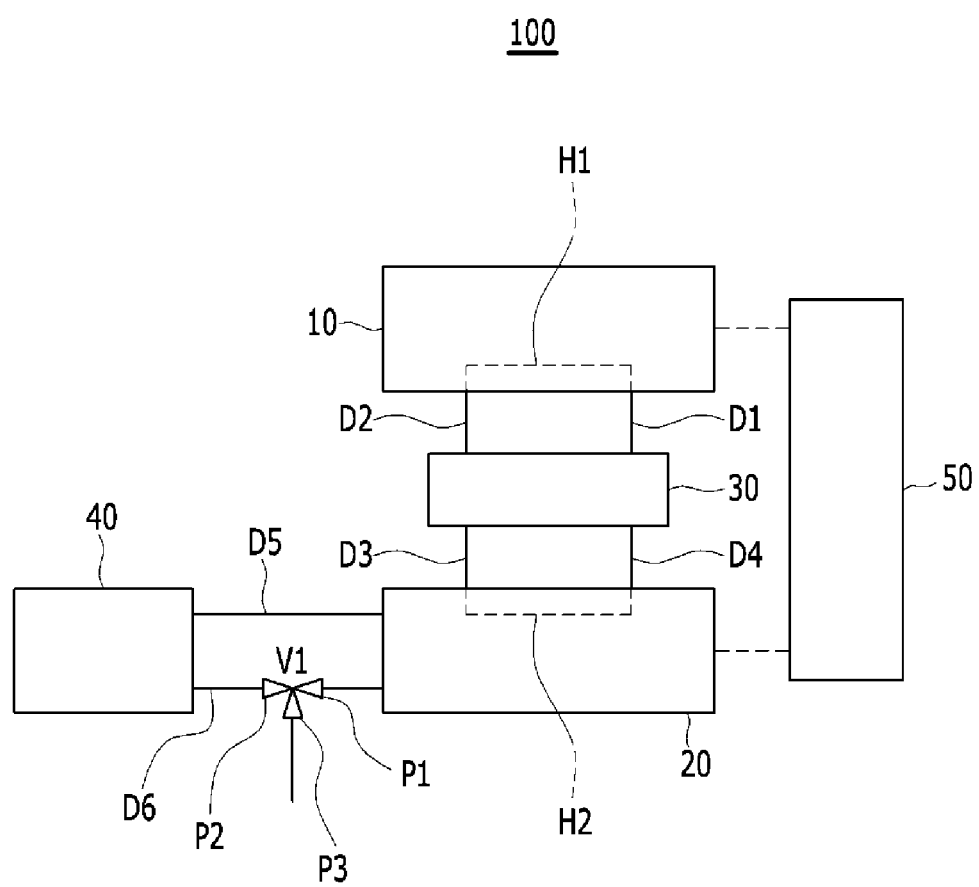
FIG. 1 illustrates a schematic view of a solid-state hydrogen storage device according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalents parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

FIG. 1 illustrates a schematic view of a solid-state hydrogen storage device according to a first exemplary embodiments of the present invention.

Referring to FIG. 1, a solid-state hydrogen storage device 100 of various exemplary embodiments includes a first container 10 for accommodating a solid-state hydrogen storage material, a second container 20 for accommodating a thermochemical thermal energy storage material, a third container 30 for accommodating a heat transfer medium, and pipes for circulating the heat transfer medium.

The pipes may include a first pipe D1 and a second pipe D2 connected to the first container 10 and the third container 30, and a third pipe D3 and a fourth pipe D4 connected to the second container 20 and the third container 30. The heat transfer medium transfers heat to a solid-state hydrogen storage material of the first container 10 and a thermochemical thermal energy storage material of the second container 20, but it does not react with these materials.

For the present case, a first heat exchange pipe H1 which surrounds an external side of the first container 10, or which passes through the inside of the first container 10 in a sealed state, may be positioned between the first pipe D1 and the second pipe D2. In addition, a second heat exchange pipe H2 which surrounds an external side of the second container 20, or which passes through the inside of the second container 20 in a sealed state, may be positioned between the third pipe D3 and the fourth pipe D4.

The solid-state hydrogen storage device 100 may include a fourth container 40 accommodating a catalyst. The fourth container 40 is connected to the second container 20 by a fifth pipe D5 and a sixth pipe D6. The fifth pipe D5 may be a catalyst supply pipe, and the sixth pipe D6 may be a catalyst discharge pipe.

The sixth pipe D6 is provided with a first valve V1 having one inlet port P1 and two outlet ports P2 and P3. The first outlet port P2 of the first valve V1 may be connected to the fourth container 40, and the second outlet port P3 may be connected to the outside of the solid-state hydrogen storage device 100.

The solid-state hydrogen storage device 100 may include an auxiliary heater 50. When it is required to supply additional heat to the first container 10 and the second container 20, the auxiliary heater 50 operates to supply heat to the first container 10 and the second container 20.

A solid-state hydrogen storage material stored in the first container 10 generates heat when hydrogen is charged, and it discharges hydrogen when a reaction temperature is reached by the heat supply. For example, the solid-state hydrogen storage material may include at least one of a complex metal hydride, a metal hydride, a chemical hydride, and a hydrogen storage alloy.

The complex metal hydride of the solid-state hydrogen storage material may include at least one of $M^1AlH_4$, $M^2(AlH_4)_2$, $M^3BH_4$, $M^4(BH_4)_2$, $M^5(BH_4)_3$, $M^6NH_2$, $M^7(NH_2)_2$, $Li_2NH$, $MgNH$, lithium-magnesium amide, and lithium-magnesium imide. Herein, $M^1$ may indicate Li, Na, or Al, $M^2$ may indicate Mg or Ca, $M^3$ may indicate Li, Na, or K, $M^4$ may indicate Mg or Ca, $M^5$ may indicate Al or Ti, $M^6$ may indicate Li or Na, and $M^7$ may indicate Mg or Ca.

The metal hydride of the solid-state hydrogen storage material may include at least one of $M^8H$ and $M^9H_2$. $M^8$ may indicate Li, Na, K, Rb, or Cs, and $M^9$ may indicate Mg, Ca, Sc, Ti, or V. The chemical hydride of the solid-state hydrogen storage material may include at least one of $AlH_3$, $NH_3BH_3$, $NH_4B_3H_8$, $NH_2B_2H_5$, and $NaBP_2H_8$.

The hydrogen storage alloy of the solid-state hydrogen storage material may include at least one of a Ti—Cr—V alloy, TiFe, Pd—$M^{10}$, a Mg—Co alloy, and a La—Ni alloy. $M^{10}$ may indicate Ba, Y, or La, and $M^{11}$ may indicate Ti, V, Zr, Nb, or Hf.

The solid-state hydrogen storage material stored in the first container 10 is not limited to the examples described above, and any material that can be used as a hydrogen source for the hydrogen fuel cell may be used. Table 1 shows examples of the solid-state hydrogen storage material.

TABLE 1

| Chemical reaction | Reaction temperature (° C.) at 1 atm | Heat amount (kJ/kg) |
| --- | --- | --- |
| $Mg + H_2 \leftrightarrow MgH_2$ | 259 | 2831 |
| $NaH + Al + 1.5H_2 \leftrightarrow NaAlH_4$ | 120-180 | 1472 |
| $Al + 1.5H_2 \leftrightarrow AlH_3$ | 125-175 | 380 |
| $MgH_2 + 2B + 3H_2 \leftrightarrow Mg\,BH_{42}$ | 200-300 | 2615 |
| $TiV_{0.62}Mn_{1.5} + H_2 \leftrightarrow TiV_{0.62}Mn_{1.5}H_2$ | −6 | 308 |

The thermochemical thermal energy storage material stored in the second container 20 is heated by the chemical reaction with the catalyst while the catalyst is supplied, and it is separated into a metal oxide and the catalyst by the chemical reaction while heat is supplied. In the first exemplary embodiment, the catalyst is water ($H_2O$), and the fourth container 40 stores the water. In the first exemplary embodiment, the thermochemical thermal energy storage material stored in the second container 20 may include at least one of magnesium hydroxide $Mg(OH)_2$, calcium hydroxide $Ca(OH)_2$, beryllium hydroxide $Be(OH)_2$, manganese hydroxide $Mn(OH)_2$, nickel hydroxide $Ni(OH)_2$, zinc hydroxide $Zn(OH)_2$ and so on.

$Mg(OH)_2$ is separated into MgO and $H_2O$ (water vapor) by a chemical reaction while the heat is supplied, and in the present case, the chemical reaction is an endothermic reaction. In contrast, when water is supplied to MgO, MgO is changed into $Mg(OH)_2$ by a chemical reaction, and in the instant case, the chemical reaction is an exothermic reaction. Similarly, $Ca(OH)_2$ is separated into CaO and $H_2O$ (water vapor) by the chemical reaction (endothermic reaction) while the heat is supplied, and in contrast, when water is supplied to CaO, CaO is changed into $Ca(OH)_2$ by a chemical reaction (exothermic reaction). Table 2 shows reaction schemes, reaction temperatures (heat storage temperatures), and heat amounts of $Mg(OH)_2$, $Ca(OH)_2$, $Be(OH)_2$, $Mn(OH)_2$, $Ni(OH)_2$, and $Zn(OH)_2$.

TABLE 2

| Chemical reaction | Reaction temperature (° C.) at 1 atm | Heat amount (kJ/kg) |
| --- | --- | --- |
| $Mg(OH)_2 \leftrightarrow MgO + H_2O$ | 259 | 1,396 |
| $Ca(OH)_2 \leftrightarrow CaO + H_2O$ | 479 | 1,288 |
| $Be(OH)_2 \leftrightarrow BeO + H_2O$ | 70 | 1,191 |
| $Mn(OH)_2 \leftrightarrow MnO + H_2O$ | 190 | 754 |
| $Ni(OH)_2 \leftrightarrow NiO + H_2O$ | 70 | 516 |
| $Zn(OH)_2 \leftrightarrow ZnO + H_2O$ | 55 | 498.96 |

Accordingly, the thermochemical thermal energy storage material utilizes a reversible chemical reaction and thus has low heat loss, and it has a relatively longer thermal energy storage time than a thermal energy storage material using sensible heat and latent heat, so that it may store heat energy even when it is not used for a long period including a parking period.

The heat transfer medium stored in the third container 30 may include at least one of water, air, and an oil.

Figure 2:
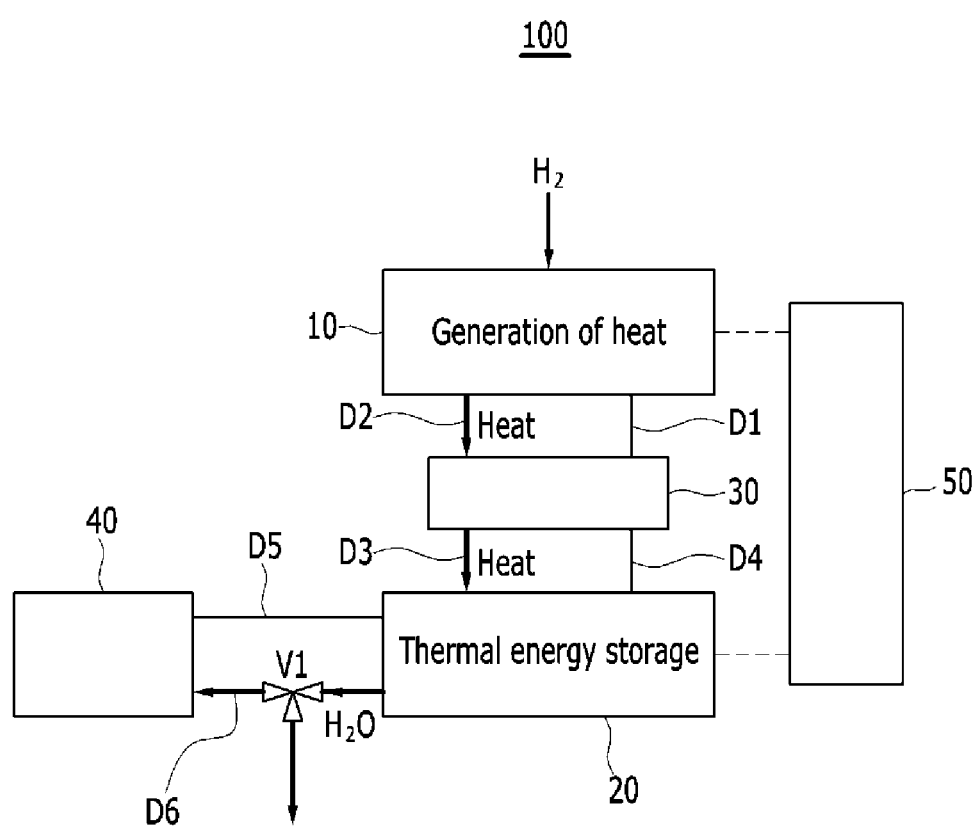
FIG. 2 illustrates a schematic view of a process of charging the solid-state hydrogen storage device illustrated in FIG. 1 with hydrogen.

FIG. 2 illustrates a schematic view of a process of charging the solid-state hydrogen storage device illustrated in FIG. 1 with hydrogen.

Referring to FIG. 2, the first container 10 is filled with hydrogen. Then, the solid-state hydrogen storage material of the first container 10 chemically reacts with the hydrogen and generates heat. The heat generated in the first container 10 is transferred to the third container 30 by the heat transfer medium to heat the heat transfer medium, and the heated heat transfer medium is transferred to the second container 20 to supply heat to the thermochemical thermal energy storage material of the second container 20. The thermochemical thermal energy storage material of the second container 20 is separated into a metal oxide and a catalyst ($H_2O$) by a chemical reaction (endothermic reaction) and stores heat energy.

While the hydrogen is filled (charged), the heat transfer medium may move inside the second pipe D2 and the third pipe D3. The catalyst ($H_2O$, water vapor) of the second container 20 is supplied to the fourth container 40 through the sixth pipe D6 and the first valve V1, and then may be stored in the fourth container 40 as water or may be discharged out of the solid-state hydrogen storage device 100. In the present process, when an amount of heat energy stored in the second container 20 is not sufficient, the auxiliary heater 50 may operate to supply heat to at least one of the first container 10 and the second container 20.

Figure 3:
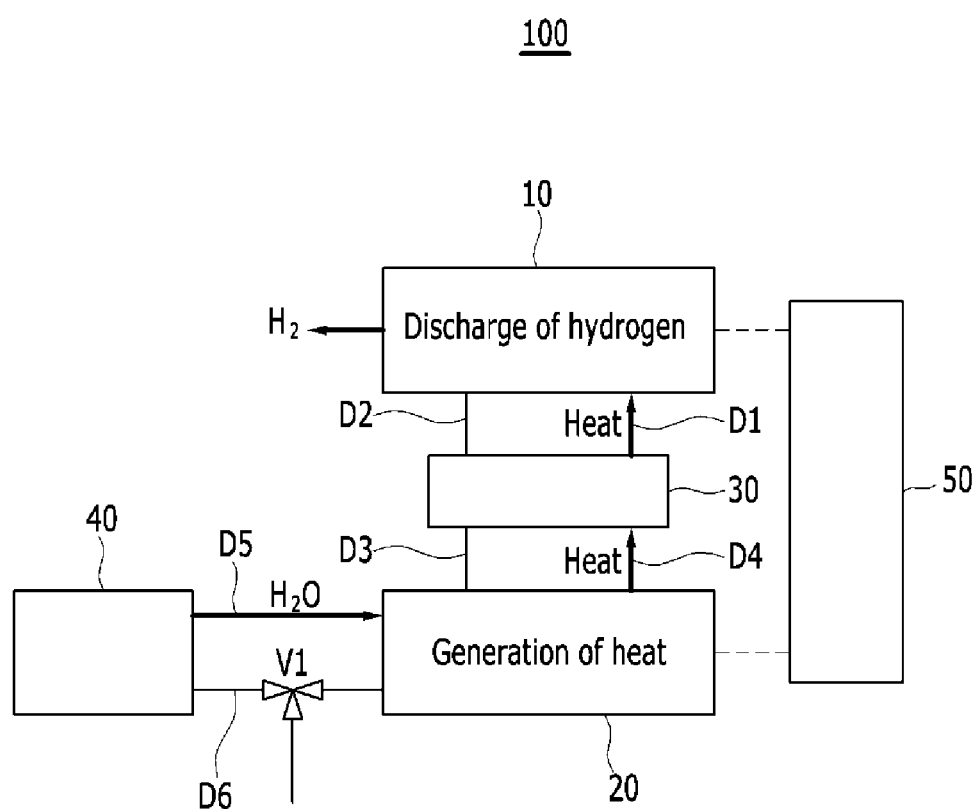
FIG. 3 illustrates a schematic view of a process of discharging hydrogen from the solid-state hydrogen storage device illustrated in FIG. 1.

FIG. 3 illustrates a schematic view of a process of discharging hydrogen from the solid-state hydrogen storage device illustrated in FIG. 1.

Referring to FIG. 3, the catalyst ($H_2O$) is supplied from the fourth container 40 to the second container 20. Then, the thermochemical thermal energy storage material of the second container 20 chemically reacts with the catalyst ($H_2O$) and generates heat. The heat generated in the second container 20 is transferred to the third container 30 by the heat transfer medium to heat the heat transfer medium, and the heated heat transfer medium is transferred to the first container 10 to supply heat to the solid-state hydrogen storage material of the first container 10. Then, the solid-state hydrogen storage material of the first container 10 reaches a predetermined reaction temperature to discharge hydrogen.

While the hydrogen is discharged, the catalyst ($H_2O$) stored in the fourth container 40 is supplied to the second container 20 through the fifth pipe D5, and the heat transfer medium may move inside the fourth pipe D4 and the first pipe D1. Before the solid-state hydrogen storage material of the first container 10 reaches the reaction temperature, the heat storage amount of the second container 20 may be exhausted, or the auxiliary heater 50 may operate to supply heat to at least one of the first container 10 and the second container 20 during an initial cold start.

Figure 4:
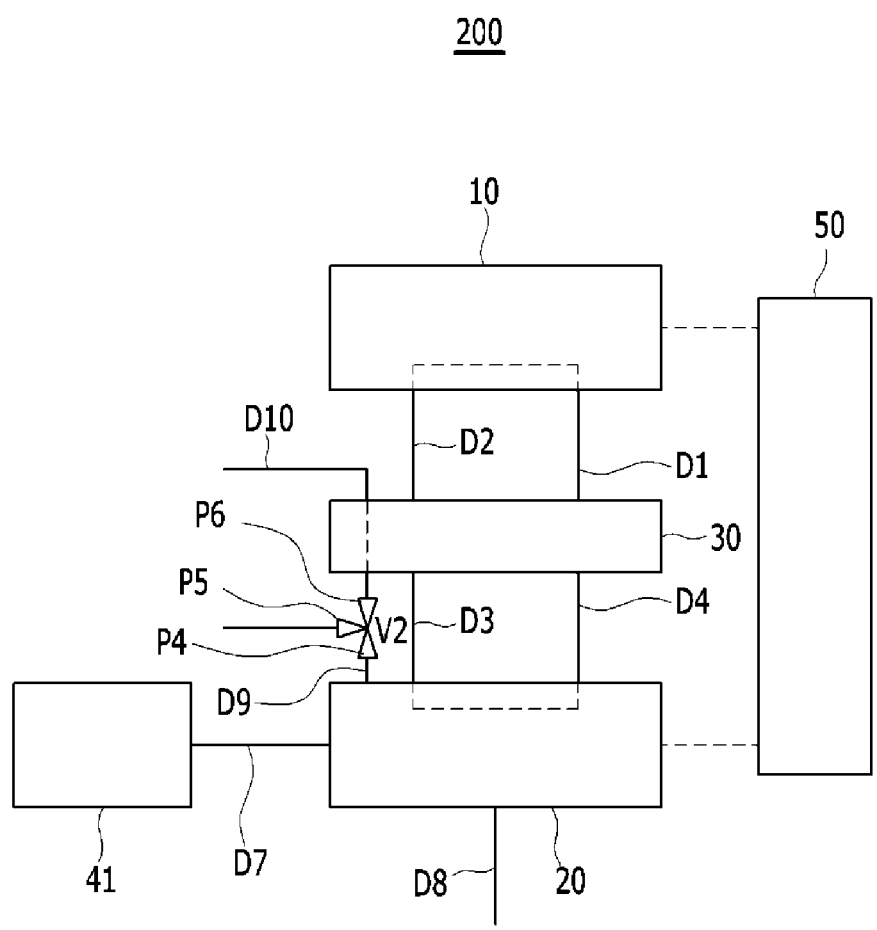
FIG. 4 illustrates a schematic view of a solid-state hydrogen storage device according to various exemplary embodiments of the present invention.

FIG. 4 illustrates a schematic view of a solid-state hydrogen storage device according to a second exemplary embodiment of the present invention.

Referring to FIG. 4, in a solid-state hydrogen storage device 200 of the second exemplary embodiment, the catalyst of the thermochemical thermal energy storage material is oxygen ($O_2$), and an air supply device 41 replaces the fourth container of the first exemplary embodiment. In the second exemplary embodiment, the thermochemical thermal energy storage material stored in the second container 20 may include at least one of cobalt oxide ($Co_3O_4$), manganese oxide ($Mn_2O_3$), lithium oxide ($Li_2O_2$), magnesium oxide ($MgO_2$), chromium oxide ($Cr_5O_{12}$), platinum oxide ($PtO_2$), antimony oxide ($Sb_2O_5$) and so on.

While the heat is supplied, $2Co_3O_4$ is separated into $6CoO$ and $O_2$ by a chemical reaction, and in the present case, the chemical reaction is an endothermic reaction. In contrast, when oxygen is supplied to $6CoO$, $6CoO$ is changed into $2Co_3O_4$ by a chemical reaction, and in the present case, the chemical reaction is an exothermic reaction. Similarly, while the heat is supplied, $5Mn_2O_3$ is separated into $5Mn_3O_4$ and $O_2$ by a chemical reaction (endothermic reaction), and in contrast, when oxygen is supplied to $5Mn_3O_4$, $5Mn_3O_4$ is changed into $5Mn_2O_3$ by the chemical reaction (exothermic reaction). Table 3 shows reaction schemes, reaction temperatures (heat storage temperatures), and heat amounts of $Co_3O_4$, $Mn_2O_3$, $Li_2O_2$, $MgO_2$, $Cr_5O_{12}$, $PtO_2$ and $Sb_2O_5$.

TABLE 3

| Chemical reaction | Reaction temperature (° C.) at 1 atm. | Heat amount (kJ/kg) |
| --- | --- | --- |
| $2Co_3O_4 \leftrightarrow 6CoO + O_2$ | 870 | 1703 |
| $5Mn_2O_3 \leftrightarrow 5Mn_3O_4 + O_2$ | 1586 | 1237 |
| $2Li_2O_2 \leftrightarrow 2Li_2O + O_2$ | 145 | 745.9 |
| $2MgO_2 \leftrightarrow 2MgO + O_2$ | 205 | 380.6 |
| $4Cr_5O_{12} \leftrightarrow 10Cr_2O_3 + 9O_2$ | 105 | 279.1 |
| $2PtO_2 \leftrightarrow 2PtO + O_2$ | 420 | 276.5 |
| $2Sb_2O_5 \leftrightarrow 4SbO_2 + O_2$ | 325 | 210.4 |

The air supply device 41 is connected to the second container 20 through a seventh pipe D7 to supply the catalyst ($O_2$) to the second container 20. The second container 20 is connected to an eighth pipe D8 (air discharge pipe) for discharging air while storing heat energy, and to a ninth pipe D9 (pressure control pipe) for control pressure by discharging residual air while discharging heat.

The ninth pipe D9 may be provided with a second valve V2 having one inlet port P4 and two outlet ports P5 and P6. The third outlet port P5 of the second valve V2 may be opened to the outside of the solid-state hydrogen storage device 200, and the fourth outlet port P6 may be connected to a tenth pipe D10 which is opened to the outside of the solid-state hydrogen storage device 200 through the third container 30.

The solid-state hydrogen storage device 200 of the second exemplary embodiment has the same or similar configuration as that of the solid-state hydrogen storage device 100 of the first exemplary embodiment except for the configuration described above, so a duplicate description thereof will be omitted.

Figure 5:
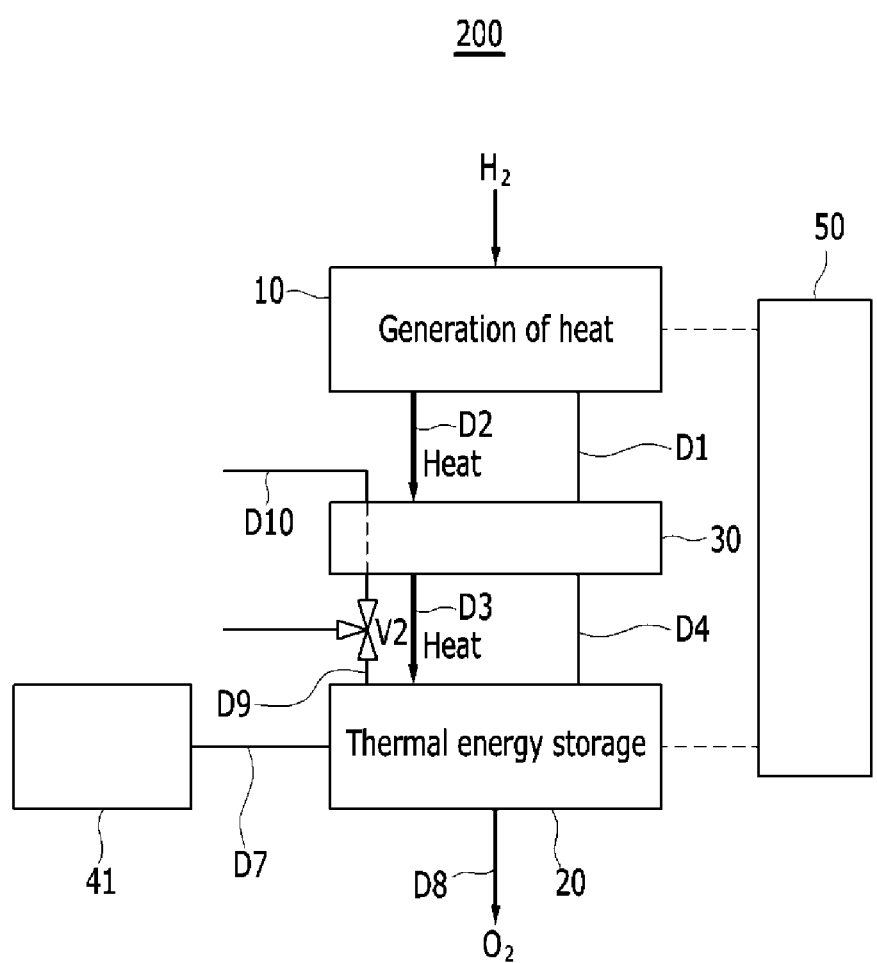
FIG. 5 illustrates a schematic view of a process of charging the solid-state hydrogen storage device illustrated in FIG. 4 with hydrogen.

FIG. 5 illustrates a schematic view of a process of charging the solid-state hydrogen storage device illustrated in FIG. 4 with hydrogen.

Referring to FIG. 5, the first container 10 is filled with hydrogen. Then, the solid-state hydrogen storage material of the first container 10 chemically reacts with the hydrogen and generates heat. The heat generated in the first container 10 is transferred to the third container 30 by the heat transfer medium to heat the heat transfer medium, and the heated heat transfer medium is transferred to the second container 20 to supply heat to the thermochemical thermal energy storage material of the second container 20. The thermochemical thermal energy storage material of the second container 20 is separated into a metal oxide and a catalyst ($O_2$) by a chemical reaction (endothermic reaction) and stores heat energy.

While the hydrogen is charged, the heat transfer medium may move inside the second pipe D2 and the third pipe D3. The catalyst ($O_2$) of the second container 20 may be discharged out of the solid-state hydrogen storage device 200 through the eighth pipe D8. In the present process, when an amount of heat energy stored in the second container 20 is not sufficient, the auxiliary heater 50 may operate to supply heat to at least one of the first container 10 and the second container 20.

Figure 6:
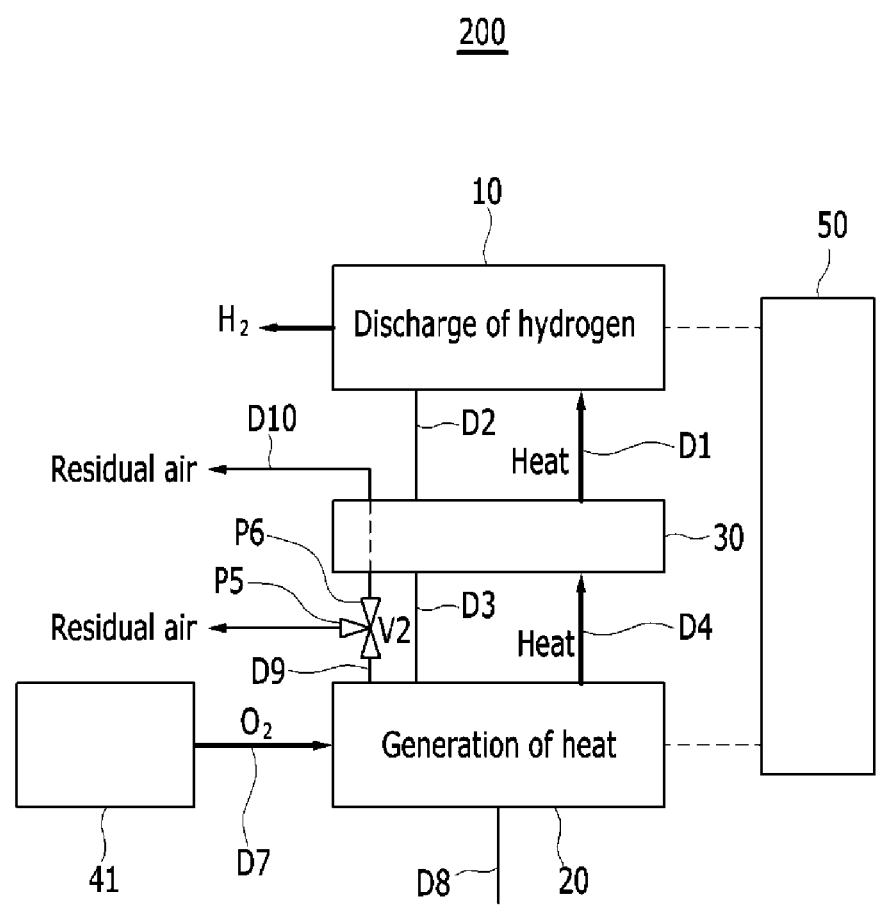
FIG. 6 illustrates a schematic view of a process of discharging hydrogen from the solid-state hydrogen storage device illustrated in FIG. 4.

FIG. 6 illustrates a schematic view of a process of discharging hydrogen from the solid-state hydrogen storage device illustrated in FIG. 4.

Referring to FIG. 6, the catalyst ($O_2$) is supplied from the air supply device 41 to the second container 20. Then, the thermochemical thermal energy storage material of the second container 20 chemically reacts with the catalyst ($O_2$) and generates heat. The heat generated in the second container 20 is transferred to the third container 30 by the heat transfer medium to heat the heat transfer medium, and the heated heat transfer medium is transferred to the first container 10 to supply heat to the solid-state hydrogen storage material of the first container 10. Then, the solid-state hydrogen storage material of the first container 10 reaches a predetermined reaction temperature to discharge hydrogen.

While the hydrogen is discharged, the catalyst ($O_2$) stored in the fourth container 40 is supplied to the second container 20 through the seventh pipe D7, and the heat transfer medium may move inside the fourth pipe D4 and the first pipe D1. The residual air of the second container 20 may be discharged out of the solid-state hydrogen storage device 200 through the ninth pipe D9 and the second valve V2 for pressure control of the second container 20.

In the above case, when a temperature of the residual air discharged from the second container 20 is lower than that of the heat transfer medium of the third container 30 the third outlet port P5 may be opened, and when the temperature of the residual air is higher than that of the heat transfer medium of the third container 30 the fourth outlet port P6 may be opened. In the latter case, the heat of the residual air is supplied to the heat transfer medium of the third container 30 and then discharged out of the solid hydrogen storage device 200.

A temperature detector configured for detecting the temperature of the residual air discharged from the second container 20 may be disposed at the ninth pipe D9, and a controller configured to control the opening of the third outlet port P5 and the fourth outlet port P6 according to a measurement result of the temperature sensor. In the latter case, the thermal efficiency of the solid-state hydrogen storage device 200 may be further improved.

Before the solid-state hydrogen storage material of the first container 10 reaches the reaction temperature, the heat storage amount of the second container 20 may be exhausted, or the auxiliary heater 50 may operate to supply heat to at least one of the first container 10 and the second container 20 during an initial cold start.

Figure 7:
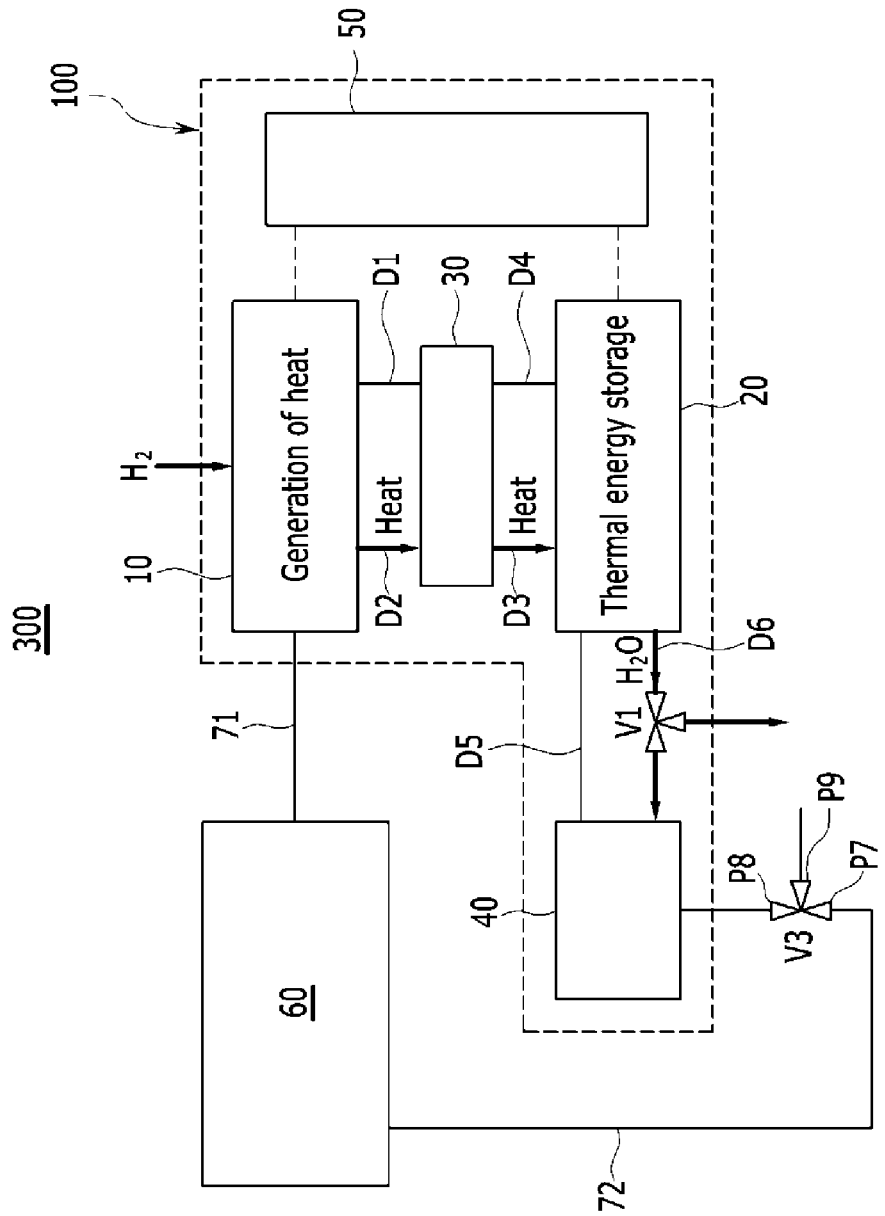
FIG. 7 and FIG. 8 illustrate schematic views of a thermal management system for a fuel cell vehicle according to various exemplary embodiments of the present invention.
Figure 8:
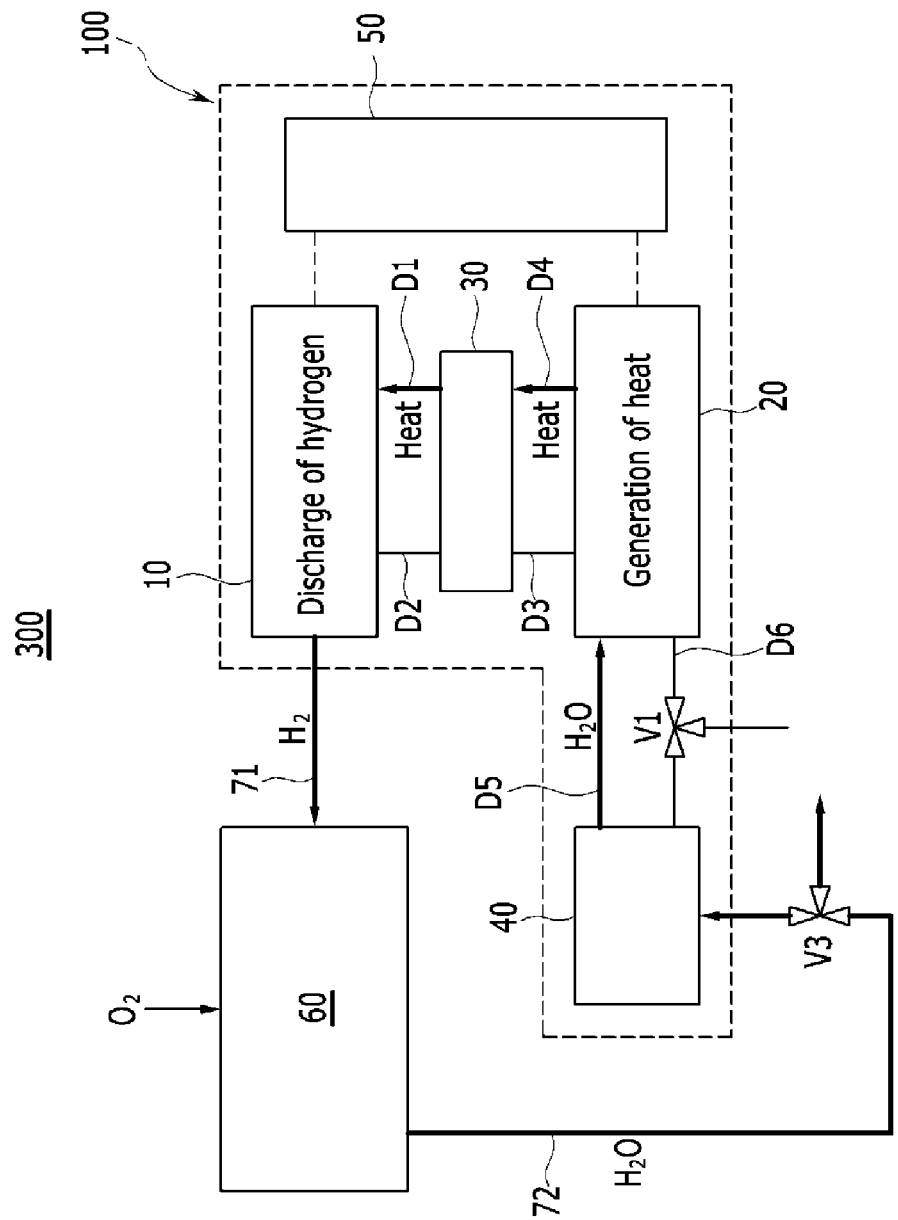

FIG. 7 and FIG. 8 illustrate schematic views of a thermal management system for a fuel cell vehicle according to a third exemplary embodiment of the present invention. The thermal management system for the fuel cell vehicle may be referred to as a fuel cell system. FIG. 7 illustrates a hydrogen charging process, and FIG. 8 illustrates a hydrogen discharging process.

Referring to FIG. 7, a thermal management system 300 for a fuel cell vehicle of the third exemplary embodiment includes a fuel cell stack 60, the solid-state hydrogen storage device 100 of the aforementioned first exemplary embodiment, a hydrogen supply pipe 71 that is disposed to be connected to the first container 10 of the solid-state hydrogen storage device 100 and the fuel cell stack 60, and a water supply pipe 72 that is disposed to be connected to the fuel cell stack 60 and the fourth container 40 of the solid-state hydrogen storage device 100.

The fuel cell stack 60 may be a hydrogen fuel cell stack that receives hydrogen and air configured to generate electricity and discharge pure water. The hydrogen supply pipe 71 connects a hydrogen outlet of the first container 10 and a fuel inlet of the fuel cell stack 60, and the water supply pipe 72 connects a water outlet of the fuel cell stack 60 and the fourth container 40.

The water supply pipe 72 may be provided with a third valve V3 having one inlet port P7 and two outlet ports P8 and P9. The fifth outlet port P8 of the third valve V3 may be connected to the fourth container 40, and the sixth outlet port P9 may be connected to the outside of the thermal management system 300 for a fuel cell vehicle.

When the first container 10 is filled (or charged) with hydrogen, the solid-state hydrogen storage material of the first container 10 chemically reacts with the hydrogen and generates heat. The heat generated in the first container 10 is transferred to the third container 30 by the heat transfer medium to heat the heat transfer medium, and the heated heat transfer medium is transferred to the second container 20 to supply heat to the thermochemical thermal energy storage material of the second container 20. The thermochemical thermal energy storage material of the second container 20 is separated into a metal oxide and a catalyst ($H_2O$) by a chemical reaction (endothermic reaction) and stores heat energy.

While the hydrogen is charged, the catalyst ($H_2O$, water vapor) of the second container 20 is supplied to the fourth container 40 through the sixth pipe D6 and the first valve V1, and then may be stored in the fourth container 40 as water or may be discharged out of the solid-state hydrogen storage device 100. When an amount of heat energy stored in the second container 20 is not sufficient, the auxiliary heater 50 may operate to supply heat to at least one of the first container 10 and the second container 20.

Referring to FIG. 8, the catalyst ($H_2O$) is supplied from the fourth container 40 to the second container 20. Then, the thermochemical thermal energy storage material of the second container 20 chemically reacts with the catalyst ($H_2O$) and generates heat. The heat generated in the second container 20 is transferred to the third container 30 by the heat transfer medium to heat the heat transfer medium, and the heated heat transfer medium is transferred to the first container 10 to supply heat to the solid-state hydrogen storage material of the first container 10.

Then, the solid-state hydrogen storage material of the first container 10 reaches a predetermined reaction temperature to discharge hydrogen, and the hydrogen is supplied the fuel cell stack 60 through the hydrogen supply pipe 71. The fuel cell stack 60 generates electricity by receiving hydrogen and oxygen, and discharges water as a reaction by-product. The discharged water is transferred to the fourth container 40 through the water supply pipe 72 and the third valve V3, and then may be stored in the fourth container 40 or may be discharged out of the thermal management system 300 for the fuel cell vehicle.

While the hydrogen is discharged, before the solid-state hydrogen storage material of the first container 10 reaches the reaction temperature, the heat storage amount of the second container 20 may be exhausted, or the auxiliary heater 50 may operate to supply heat to at least one of the first container 10 and the second container 20 during an initial cold start.

Figure 9:
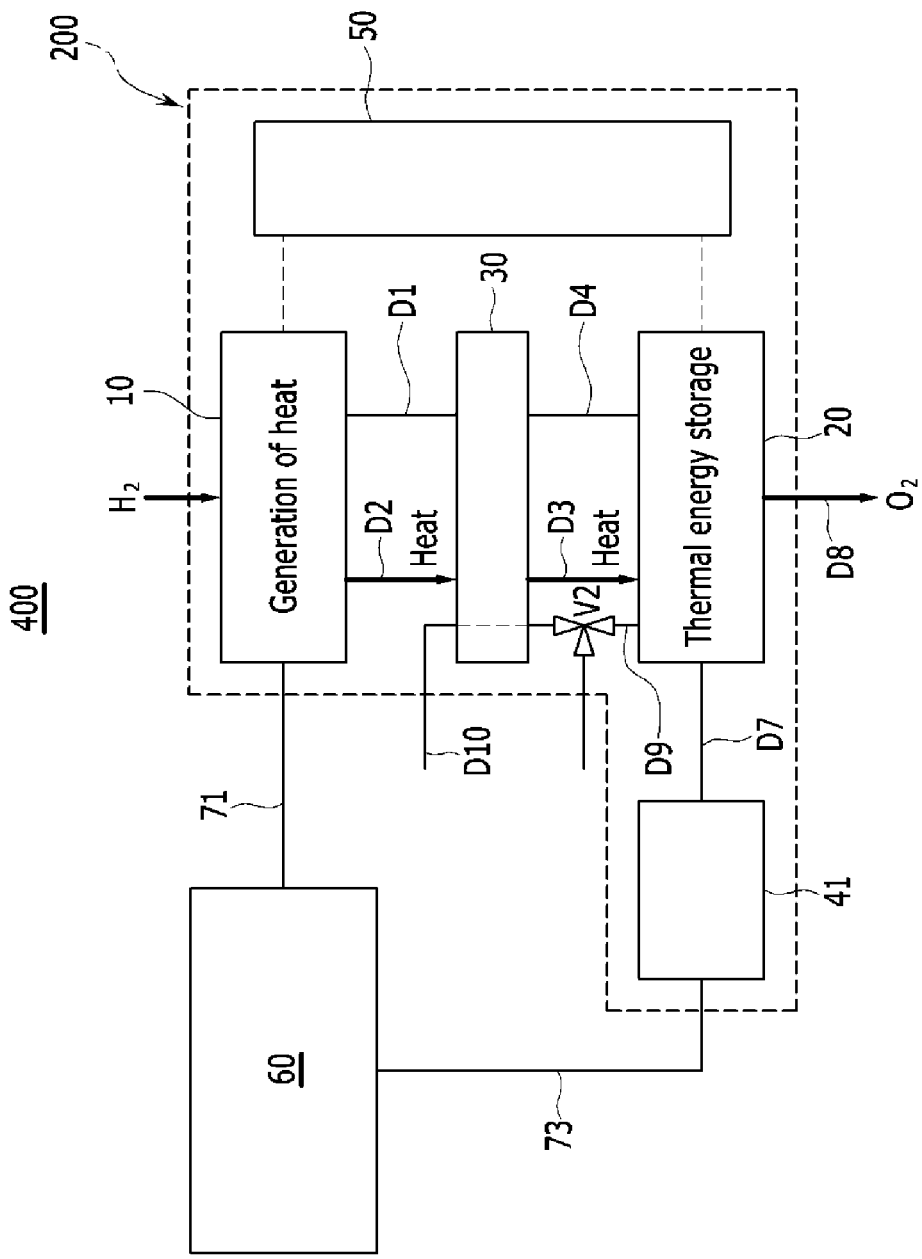
FIG. 9 and FIG. 10 illustrate schematic views of a thermal management system for a fuel cell vehicle according to various exemplary embodiments of the present invention.
Figure 10:
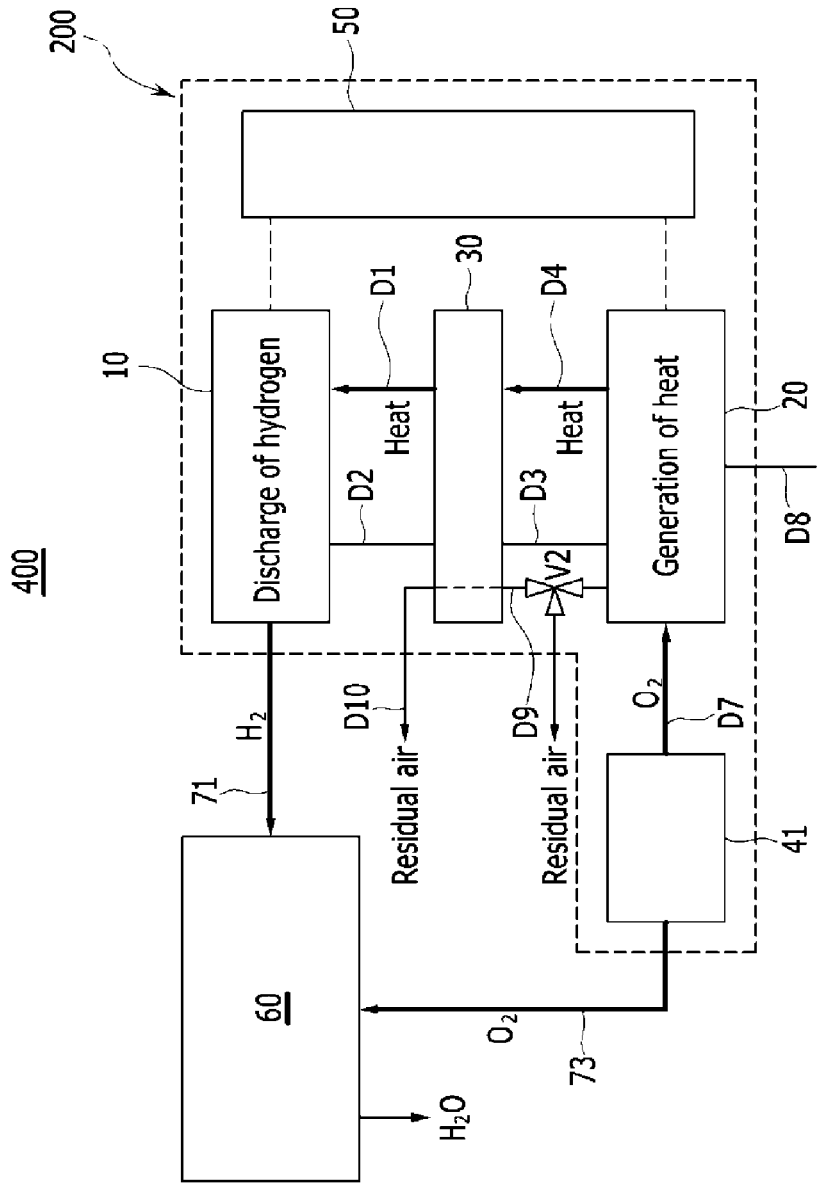

FIG. 9 and FIG. 10 illustrate schematic views of a thermal management system for a fuel cell vehicle according to a fourth exemplary embodiment of the present invention. The thermal management system for the fuel cell vehicle may be referred to as a fuel cell system. FIG. 9 illustrates a hydrogen charging process, and FIG. 10 illustrates a hydrogen discharging process.

Referring to FIG. 9, a thermal management system 400 for a fuel cell vehicle of a fourth exemplary embodiment includes the fuel cell stack 60, the solid-state hydrogen storage device 200 of the aforementioned second exemplary embodiment, the hydrogen supply pipe 71 that is disposed to be connected to the first container 10 of the solid-state hydrogen storage device 200 and the fuel cell stack 60, and an air supply pipe 73 that is disposed to be connected to the air supply device 41 of the solid-state hydrogen storage device 200 and the fuel cell stack 60.

The fuel cell stack 60 and the hydrogen supply pipe 71 are the same as those of the third exemplary embodiment, and the air supply pipe 73 connects the air supply device 41 and an air inlet pipe of the fuel cell stack 60.

When the first container 10 is charged with hydrogen, the solid-state hydrogen storage material of the first container 10 chemically reacts with the hydrogen and generates heat. The heat generated in the first container 10 is transferred to the third container 30 by the heat transfer medium to heat the heat transfer medium, and the heated heat transfer medium is transferred to the second container 20 to supply heat to the thermochemical thermal energy storage material of the second container 20. The thermochemical thermal energy storage material of the second container 20 is separated into a metal oxide and a catalyst ($H_2O$) by a chemical reaction (endothermic reaction) and stores heat energy.

While the hydrogen is charged, the catalyst ($O_2$) of the second container 20 is discharged out of the solid-state hydrogen storage device 200 through the eighth pipe D8. When an amount of heat energy stored in the second container 20 is not sufficient, the auxiliary heater 50 may operate to supply heat to at least one of the first container 10 and the second container 20.

Referring to FIG. 10, the catalyst ($O_2$) is supplied to the second container 20 through the seventh pipe D7 from the air supply device 41. Then, the thermochemical thermal energy storage material of the second container 20 chemically reacts with the catalyst ($O_2$) and generates heat. The heat generated in the second container 20 is transferred to the third container 30 by the heat transfer medium to heat the heat transfer medium, and the heated heat transfer medium is transferred to the first container 10 to supply heat to the solid-state hydrogen storage material of the first container 10.

Then, the solid-state hydrogen storage material of the first container 10 reaches a predetermined reaction temperature to discharge hydrogen, and the hydrogen is supplied the fuel cell stack 60 through the hydrogen supply pipe 71. At the same time, air is supplied to the air inlet of the fuel cell stack 60 through the air supply pipe 73 from the air supply device 41. The fuel cell stack 60 generates electricity by receiving hydrogen and air, and discharges water as a reaction by-product.

While the hydrogen is discharged, before the solid-state hydrogen storage material of the first container 10 reaches the reaction temperature, the heat storage amount of the second container 20 may be exhausted, or the auxiliary heater 50 may operate to supply heat to at least one of the first container 10 and the second container 20 during an initial cold start.

According to the thermal management systems 300 and 400 for the fuel cell vehicle, since the thermochemical thermal energy storage material is used as a main heat source for discharging hydrogen, a separate power supply for supplying heat to the first container 10 is not required, and it is possible to not use power except for operating the auxiliary heater 50 for a short time when an initial chemical reaction is started or when an emergency occurs. Accordingly, the power generated in the fuel cell stack 60 may be fully utilized for driving the vehicle, improving fuel efficiency.

In addition, since the thermochemical thermal energy storage material with excellent reversibility is utilized, heat loss is small during charging and discharging, and since it is possible to control heat dissipation using the catalyst ($H_2O$ or $O_2$), the thermal management system for the fuel cell vehicle is safe and environmentally friendly. Further, in a case in which heating is required, when the catalyst is supplied to the second container 20 without operating the fuel cell stack 60, since the heating may be performed by the thermal energy emitted from the second container 20, it is possible to improve energy efficiency.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with respect to the positions of such features as displayed in the figures.

The foregoing descriptions of specific exemplary embodiments of the present invention have been presented for purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A thermal management system for a fuel cell vehicle, comprising:
    a fuel cell stack configured to receive hydrogen and air to generate electricity and to discharge water;
    a solid-state hydrogen storage device configured to include:
    a first container accommodating a solid-state hydrogen storage material comprising a hydride or a hydrogen storage alloy,
    a second container accommodating a thermochemical thermal energy storage material; wherein the second container is configured to receive oxygen and wherein the thermochemical thermal energy storage material comprises a metal oxide, a third container accommodating a heat transfer medium, and pipes connected to the first container, the second container,
    and the pipes of the third container circulate the heat transfer medium amongst the first container and the second container and the third container; and
    a hydrogen supply pipe configured to be connected to the first container and the fuel cell stack.

2. The thermal management system for the fuel cell vehicle of claim 1, wherein:
    the solid-state hydrogen storage material includes a material that generates heat while occluding hydrogen and discharges hydrogen while receiving heat, and
    the thermochemical thermal energy storage material generates heat while oxygen is supplied, and is separated into a metal oxide and oxygen and stores heat energy during receiving heat.

3. The thermal management system for the fuel cell vehicle of claim 2, wherein: the thermochemical thermal energy storage material includes at least one of $Co_3O_4$, $Mn_2O_3$, $Li_2O_2$, $MgO_2$, $Cr_5O_{12}$, $PtO_2$ and $Sb_2O_5$.

4. The thermal management system for the fuel cell vehicle of claim 2, wherein:
    the solid-state hydrogen storage device includes
    an air supply device supplying air to the second container,
    an air discharge pipe that is disposed at the second container and discharges air during heat energy storage, and
    a pressure control pipe that is disposed at the second container and discharges residual air during heat discharge.

5. The thermal management system for the fuel cell vehicle of claim 4, wherein:
    a second valve is provided at the pressure control pipe, and
    the second valve includes an inlet port, a third outlet port connected to an outside of the solid-state hydrogen storage device, and a fourth outlet port connected to the outside of the solid-state hydrogen storage device through the third container.

6. The thermal management system for the fuel cell vehicle of claim 5, wherein:
    when a temperature of the residual air discharged to the pressure control pipe is lower than a temperature of the heat transfer medium of the third container, the third outlet port is configured to be opened, and
    when a temperature of the residual air discharged to the pressure control pipe is higher than a temperature of the heat transfer medium of the third container, the fourth outlet port is configured to be opened.

7. The thermal management system for the fuel cell vehicle of claim 4, further comprising:

an air supply pipe configured to be connected to the fuel cell stack and the air supply device.

* * * * *